United States Patent [19]

Okuno et al.

[11] 4,096,498
[45] Jun. 20, 1978

[54] EXPOSURE PROPRIETY INDICATING DEVICE FOR FLASH-PHOTOGRAPHY

[75] Inventors: Keno Okuno; Masumi Osumi, both of Kawasaki, Japan

[73] Assignee: Nippon Kogaku K.K., Tokyo, Japan

[21] Appl. No.: 672,065

[22] Filed: Mar. 30, 1976

[30] Foreign Application Priority Data

Apr. 14, 1975 Japan .................................. 50-44213

[51] Int. Cl.² ............................................. G03B 15/02
[52] U.S. Cl. ...................................... 354/127; 354/53; 354/60 L
[58] Field of Search ...................... 354/53, 54, 55, 56, 354/289, 60 E, 60 L, 127, 57, 23 R, 61, 128

[56] References Cited

U.S. PATENT DOCUMENTS

| | | | |
|---|---|---|---|
| 3,849,769 | 11/1974 | Chilia | 354/60 X |
| 3,973,267 | 8/1976 | Hashimoto | 354/60 X |
| 3,982,254 | 9/1976 | Ito et al. | 354/53 |

*Primary Examiner*—L. T. Hix
*Assistant Examiner*—M. L. Gellner
*Attorney, Agent, or Firm*—Fitzpatrick, Cella, Harper & Scinto

[57] ABSTRACT

An exposure propriety indicating device for flash-photography constructed with a circuit comprising a film sensitivity signal generating circuit, an aperture value signal generating circuit, a comparison circuit for comparing signals generated by the two generating circuits, and an indicator circuit for indicating the result of such comparison.

5 Claims, 2 Drawing Figures

EXPOSURE PROPRIETY INDICATING DEVICE FOR FLASH-PHOTOGRAPHY

BACKGROUND OF THE INVENTION

1. Field of the Invention

This invention relates to flash photography, and more particularly to a device for indicating the propriety of an exposure when using an electronic flash capable of automatic control of the quantity of light therefrom (hereinafter such an electronic flash will be referred to as an automatic control electronic flash).

2. Description of the Prior Art

When an object is to be flash-photographed by the use of an automatic control electronic flash, the relationship between the sensitivity of a photographic film and an aperture value of a photographic lens to give a proper exposure, is subject to restriction within a certain range because the maximum amount of flash light that can be obtained from the automatic control electronic flash is finite. In other words, under a certain definite film sensitivity, the aperture value of the photographic lens is limited to a certain range to be determined by both maximum and minimum amounts of flash light from the automatic control electronic flash. Likewise, the film sensitivity is restricted to a certain range, when the aperture value of the photographic lens is fixed. As the consequence, it is conceivable that when flash photography is conducted with either the film sensitivity or aperture value of the photographic lens maintained in its definite operable range, no appropriate exposure can be obtained.

SUMMARY OF THE INVENTION

Therefore, according to the present invention, we contribute a device by which we are able to indicate the correctness or to of exposure, i.e., whether the relationship between the film sensitivity and the aperture value of the photographic lens is such that a proper exposure may be obtained therefrom when an object is to be flash-photographed by the use of an automatic control electronic flash.

According to the present invention, generally speaking, we provide an exposure propriety indicating device for flash-photography which comprises a film sensitivity signal generating circuit to generate a first output signal in accordance with the sensitivity of a film, an aperture value signal generating circuit to generate a second output signal in accordance with an aperture value, a comparison circuit to compare said first and second outputs, said comparison circuit generating an actuation signal when a difference between said first output and said second output falls outside of a certain definite range to be determined by the maximum and the minimum amounts of flash light available from an automatic control electronic flash, and an indicator circuit to be actuated by the actuation signal from said comparison circuit.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein.

DETAILED DESCRIPTION OF PREFERRED EMBODIMENT

Figure 1:
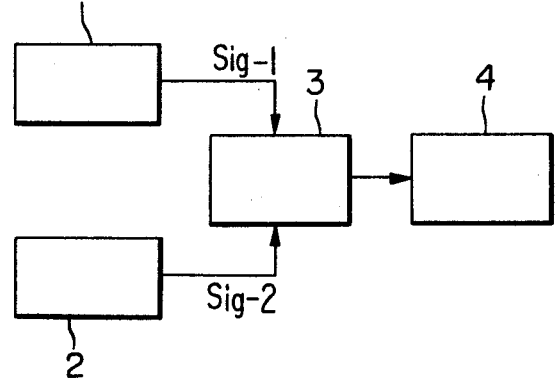
FIG. 1 is a block diagram showing a general construction of the exposure propriety indicating device according to the present invention.

Referring now to FIG. 1 which is a block diagram showing the principle of the device according to the present invention, there are shown a film sensitivity signal generating circuit 1 which generates a film sensitivity signal sig-1 which varies in accordance with information on the sensitivity of the film loaded in a camera; an aperture value signal generating circuit 2 which generates an aperture value signal sig-2 which varies in accordance with an aperture value of a photographic lens of the camera; and a comparison circuit 3 into which the film sensitivity signal sig-1 and the aperture value signal sig-2 enter as inputs. The comparison circuit 3 compares both signals, i.e., sig-1 and sig-2, and generates an actuation signal when the relationship between the sensitivity of the film loaded in the camera and the aperture value of the photographic lens is such that no proper exposure can be derived therefrom for a certain definite distance from an object to be photographed. An indicating circuit 4 is actuated by the actuation signal from the comparison circuit 3 to indicate the propriety of the exposure.

Figure 2:
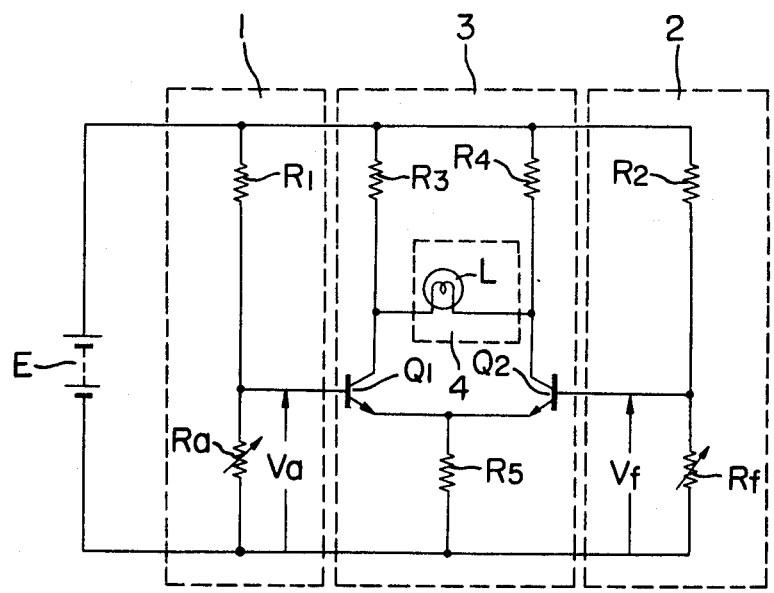
FIG. 2 is one embodiment of the circuit construction of the device shown in FIG. 1.

FIG. 2 illustrates one embodiment of an actual circuit for the exposure propriety indicating device according to the present invention. As is apparent from this circuit diagram, the film sensitivity signal generating circuit 1 consists of a resistor R1 and a variable resistor $R_a$ for setting a film sensitivity, the resistor value of which varies in accordance with setting of a film sensitivity setting dial according to the sensitivity of a film loaded in a camera (not shown). The resistor R1 and the variable resistor $R_a$ divide a voltage from a power source E. It should be understood that a voltage $V_a$ divided by the resistors $R_a$ and R1 increases as the ASA sensitivity value of the film becomes higher. The aperture value signal generating circuit 2 consists of a resistor $R_2$ and a variable resistor $R_f$ for setting an aperture value, the resistor value of which varies in an interlocking manner with setting of the aperture setting ring for the photographic lens (not shown), and which divides a voltage from the voltage source E. It should be understood that a voltage $V_f$ divided by the resistor $R_f$ increases as the aperture value of the photographic lens becomes greater, i.e., as the aperture diameter of the lens becomes smaller. The comparison circuit 3 of a differential amplification type is constructed by transistors Q1, Q2 and resistors R3, R4, R5. The divided voltage $V_a$ is applied to the base of the transistor Q1, and the divided voltage $V_f$ is applied to the base of the transistor Q2. Further, between the collectors of the transistors Q1 and Q2, there is connected an indicator lamp L as the indicating circuit 4 in FIG. 2. This indicator lamp L is positioned within a view finder of the camera (not shown). The resistor R5 is connected between a junction connecting the emitters of the transistors Q1 and Q2 and one side of the power source E, as shown; and resistors R3 and R4 are connected between the collectors of the transistors and the other side of the power source. Also, in the comparison circuit 3, there is provided an insensitive zone, by which the comparison circuit 3 is maintained in an inoperative state even when the voltage $V_f$ varies in a certain range, while the voltage $V_a$ is maintained constant, and even when the voltge $V_a$ varies within a certain range, while the voltage $V_f$ is maintained constant. The breadth of this insensitive zone corresponds to a difference between the maximum and minimum amounts of flash light of each flashing operation of the automatic control electronic flash, whereby once the automatic control electronic flash to be used is determined, the breadth of this zone can be established without being varied thereafter.

The operation of the above-described circuit will now be explained.

When a film is loaded in a camera, and a film sensitivity dial is set with the loaded film sensitivity in the camera (not shown), a voltage corresponding to the loaded film sensitivity is generated across the terminals of the film sensitivity setting resistor $R_a$. Then, a photographer selects an aperture lens for flash-photography. In this case, if the aperture value of the photographic lens is selected within a certain range of the aperture value giving a proper exposure, collector current in each of the transistors Q1 and Q2 takes the same value, and the indicating lamp L is not turned on with the voltage which is generated in the aperture value setting resistor $R_f$. This indicator lamp L, in the off condition, shows that a proper exposure can be obtained by use of the flash. When the aperture value of the photographic lens exceeds the upper limit of a certain range for a proper exposure, the transistor Q1 in the comparison circuit assumes a non-conductive state and the transistor Q2 therein assumes a conductive state, whereby the indicator lamp L is turned on. Also, when the aperture value of the photographic lens is lower than the lower limit of a certain range for a proper exposure, the transistor Q1 in the comparison circuit becomes conductive, and the transistor Q2 therein becomes non-conductive, whereby the indicator lamp L is turned on.

Accordingly, by the turning on of the indicator lamp L, the photographer is advised that the aperture value of the photographic lens is outside the range of the aperture value giving the required proper exposure. Further, even when a film of a different sensitivity is used, while maintaining the aperture value of the photographic lens constant, the turning on of the lamp L indicates that the sensitivity of this film is outside the range of the film sensitivity for a proper exposure.

As mentioned in the foregoing, the preferred embodiment of the present invention is so constructed that the film sensitivity setting resistor $R_a$ and the aperture value setting resistor $R_f$ are interlocked with the film sensitivity dial plate and the aperture setting ring of the photographic lens, respectively, and the state of the lamp L, when turned on, may be observed through the range view finder so that it becomes easy to recognize while operating the camera whether the desired proper exposure has been obtained or not which is very convenient from the standpoint of camera operation. It should be understood that the film sensitivity setting resistor $R_a$ and the aperture value setting resistor $R_f$ are not limited to the type mentioned above, wherein they are interlocked with the film sensitivity dial plate and the aperture setting ring for the photographic lens.

From the foregoing description, it will be seen that we contribute by the present invention means whereby it is feasible to indicate, when an object at a certain definite distance from a photographer is to be taken by the use of an automatic control electronic flash, whether the sensitivity of the film loaded in the camera and the aperture value of the photographic lens are in such a relationship as to permit a proper exposure, or not, with the consequence that no error in the exposure will be made on the part of the photographer.

We believe that the construction and operation of our novel exposure propriety indicating device will now be understood and that the several advantages thereof will be fully appreciated by those persons skilled in the art.

We claim:

1. An exposure propriety indicating device for flash-photography of an object located a given distance therefrom comprising:
   a. a film sensitivity signal generating circuit for generating a first output signal in accordance with the sensitivity of a selected film;
   b. an aperture value signal generating circuit for generating a second output signal in accordance with an aperture value;
   c. a comparison circuit for comparing said first and second output signals, said comparison circuit generating an actuation signal when a difference between said first output signal and said second output signal falls outside of a range of be determined by the maximum and the minimum amounts of flash light from an automatic control electronic flash; and
   d. an indicator circuit for actuation by said actuation signal from said comparison circuit.

2. The device as defined in claim 1, wherein said comparison circuit is provided with an insensitive zone therein, by which no actuation signal is generated when the difference between said first and second output signals is within the range to be determined by the maximum and the minimum amounts of flash light from the automatic control electronic flash.

3. The device as defined in claim 1, wherein said indicator circuit includes a visual indicator positioned within a camera view finder.

4. The device as defined in claim 1, wherein said comparison circuit is of the differential amplifier type.

5. The device according to claim 4, wherein said comparison circuit includes a pair of transistors the bases of which are connected respectively to receive said first and second output signals, the emitters of which are connected to one side of a power source and the collectors of which are connected to the other side of said power source and an indicator is connected across said collectors.

* * * * *

UNITED STATES PATENT AND TRADEMARK OFFICE
CERTIFICATE OF CORRECTION

PATENT NO. : 4,096,498
DATED : June 20, 1978
INVENTOR(S) : KENO OKUNO, ET AL

It is certified that error appears in the above-identified patent and that said Letters Patent are hereby corrected as shown below:

Column 1, line 37, after "correctness or", delete "to" and insert --propriety--.

Signed and Sealed this

Twenty-sixth Day of June 1979

[SEAL]

Attest:

RUTH C. MASON
Attesting Officer

DONALD W. BANNER
Commissioner of Patents and Trademarks